(No Model.)
J. ARMSTRONG.
CORN SHOCKER.
No. 425,969. Patented Apr. 22, 1890.
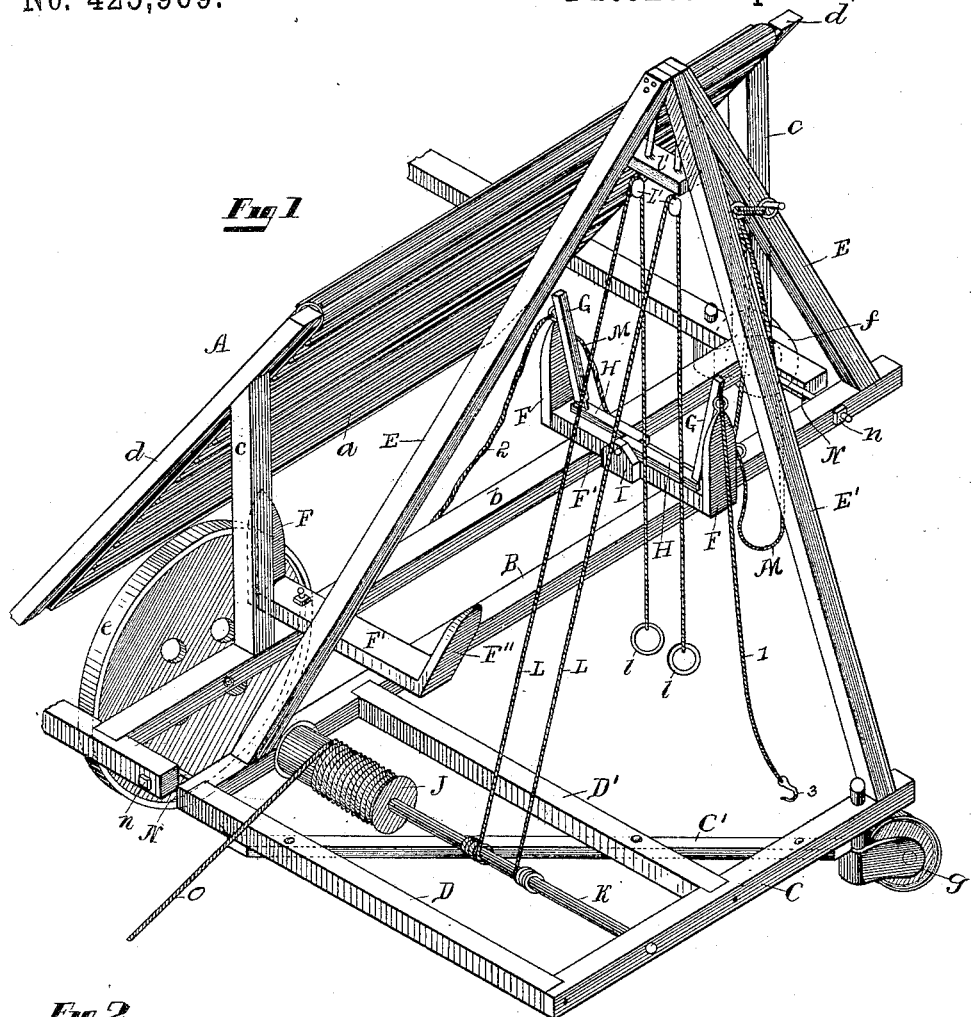
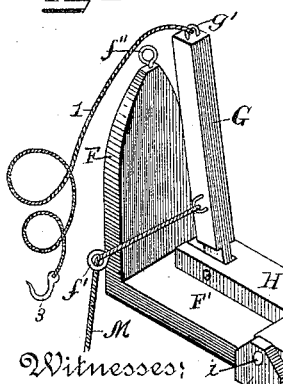
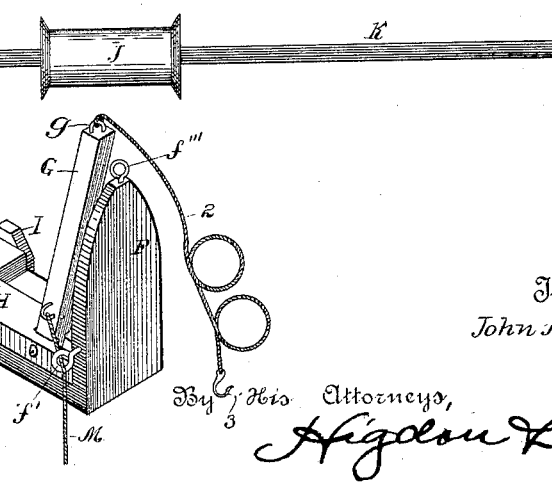
Inventor:
John Armstrong,
By His Attorneys,
Higdon & Higdon
Witnesses:
R. A. Balderson
H. C. Johnson

UNITED STATES PATENT OFFICE.

JOHN ARMSTRONG, OF VINE CREEK, KANSAS, ASSIGNOR TO HANNAH ARMSTRONG, OF SAME PLACE.

CORN-SHOCKER.

SPECIFICATION forming part of Letters Patent No. 425,969, dated April 22, 1890.

Application filed November 11, 1889. Serial No. 329,872. (No model.)

*To all whom it may concern:*

Be it known that I, JOHN ARMSTRONG, of Vine Creek, Ottawa county, Kansas, have invented certain new and useful Improvements in Corn-Shockers, of which the following is a full, clear, and exact description, reference being had to the accompanying drawings, forming a part hereof.

My invention relates to improvements in corn-shockers; and it consists in the following novel construction and arrangement illustrated in the accompanying drawings, in which—

Figure 1 is a perspective view of my corn-shocking device properly secured to the side of the corn-harvester and connected thereto by suitable bolts or rods, hereinafter described. Fig. 2 is a detail in perspective of the shocker detached from the raising-derrick; and Fig. 3 is a detail view of windlass J, secured on shaft K.

The object of my invention is to provide a corn-shocker which can be attached to any harvester that is provided with an elevator, and one that may be easily operated with economy and simplicity of construction. I attain these ends by employing the mechanism heretofore referred to.

Referring to the drawings, which represent my invention in position ready for use, B is the horizontal timber, which runs parallel with the harvester, said beam B being properly secured to beam $b$ by suitable bolts or rods N, which are secured and held in position by nuts $n$.

C is a short timber running parallel with beam B, said timbers B and C being connected and held rigid by cross-beams D and D', these being braced by a suitable beam C'.

E E are inclining supports secured on timber B. E' is a similar inclined upright having its lower ends secured on timber C. These come together at the top and are firmly bolted or otherwise rigidly secured together.

F are the upright ends of the shocking-frames F'. These are provided at their top with suitable eyes $f''$ $f'''$, through to which the ropes 1 and 2 are passed when the corn is ready for shocking.

G are arms hinged to a base H in such a manner as to firmly bind the corn when the ropes are secured in the proper method, as hereinafter described. Said bases H are hinged or pivoted to the lugs I by means of a suitable rod or bolt $i$, thus enabling them to be raised when so desired.

J is a drum or windlass firmly secured on shaft K, and around said drum J is secured the rope or cable O. This rope or cable O is operated by a horse hitched thereto in a suitable manner, and when drawn out serves to wind ropes or cables L L around shaft K. Ropes L L, after passing over pulleys L', are provided with rings $l$, in which are secured the hooks 3 3, which are secured on ends of ropes 1 and 2.

M M are ropes or cables, which are secured to arms G G by suitable staples, and after passing through eyes $f'$ are allowed to hang loosely across beams B and $b$ and are hung at any suitable place on incline beam E. Thus when the corn is inclosed in the shocker they do not interefere with the movements of said shocker, and are only for the purpose of bringing the arms G G apart and removing the shocker from the corn.

$a$ designates the inclined conveyer, which brings the corn to and deposits it in the shocker F.

$b$ is a beam heretofore referred to.

$c$ are upright beams which support timbers $d$ $e$. $f$ and $g$ are suitable wheels on which my harvesting and shocking device is mounted.

My shocking device is operated in the following manner: The corn after being harvested is conveyed by endless conveyer and deposited in the shocker F. When a sufficient quantity has collected, rope 1 is taken up and passed through eye $f''''$ at the opposite end of the shocker and rope 2 is passed through eye $f''$. They are then secured to the rings $l$ by means of hooks 3 3. The horse, which is hitched to rope or cable O, is then started, and the tension of rope O, unwinding from drum J, causes shaft K to wind ropes L L, and thus raise the shocker containing the corn from the beams B and $b$, the weight of the corn being sufficient to hold together and maintain its upright position after being deposited on the ground. When said shocker is brought to the ground, the corn is standing in an upright position. The hooks 3 3 are then loosened from rings $l\ l$, and by giving the ropes M M a sudden pull the arms G are opened, thus releasing the shock from its embrace. Said shocker is then placed in position on beams B $b$ and is ready for use again. I do not wish to confine myself to the method of raising the shocker by hitching a horse to cable O of the windlass J, as my device may be operated by having the shaft on which the drive-wheel $e$ is secured made long enough to pass through the frame-work B C. Said shaft may be provided with proper gearing for operating the same and throwing it out of gear when so desired.

Having thus fully described my invention, what I claim as being new, and desire to secure by Letters Patent, is—

1. The combination, with the derrick and its traveling supporting-frame, of the shaft K, mounted in the frame and having the drum J, the hoisting-ropes L, attached to said shaft and having rings $l$, the pulleys L′ for said ropes at the upper end of the derrick, and the shocker F, having the ropes 1 2, provided with hooks to engage the rings $l$, substantially as described.

2. A corn-shocker constructed of uprights F F, base F′, and hinged bars G, said uprights F being provided with suitable eyes $f''$ and $f'''$, through which pass ropes 1 and 2, said ropes 1 and 2 passing through the eye opposite the end to which the rope is secured, as fully set forth and described.

3. The combination, with the traveling frame and the derrick thereon, of the corn-shocker composed of the base F′, having lugs I and uprights F, the movable arms H, hinged between lugs I, the arms G, hinged to arms H, and the ropes 1 2, attached to the said arms G, all adapted to operate substantially as described.

4. The traveling frame having the inclined conveyer on one side and provided further with the derrick having the pulley L′, in combination with the hoisting-ropes L on said pulleys and the drum to operate said ropes, and the shocker comprising the base F′, having uprights F, the movable arms H on the base, the arms G, hinged to said arms H, and the ropes 1 2, attached to said hinged arms G, all adapted to operate substantially as described.

In testimony whereof I affix my signature in presence of two witnesses.

JOHN ARMSTRONG.

Witnesses:
J. E. HIGDON,
R. A. BALDERSON.